US007789212B2

(12) United States Patent
Oie et al.

(10) Patent No.: US 7,789,212 B2
(45) Date of Patent: Sep. 7, 2010

(54) CHANGE COMPLEMENT AND CONTROL SYSTEM

(75) Inventors: Yoshiro Oie, Tokyo-To (JP); Kazuyuki Shimizu, Yashio (JP); Hiroshi Tone, Tokyo-To (JP); Takahiro Washizu, Tokyo-To (JP); Ryuichi Tabata, Yokohama (JP)

(73) Assignee: Glory Ltd., Hyogo-ken (JP)

( * ) Notice: Subject to any disclaimer, the term of this patent is extended or adjusted under 35 U.S.C. 154(b) by 138 days.

(21) Appl. No.: 12/224,489

(22) PCT Filed: Feb. 2, 2007

(86) PCT No.: PCT/JP2007/051803

§ 371 (c)(1),
(2), (4) Date: Aug. 28, 2008

(87) PCT Pub. No.: WO2007/099734

PCT Pub. Date: Sep. 7, 2007

(65) Prior Publication Data

US 2009/0017740 A1 Jan. 15, 2009

(30) Foreign Application Priority Data

Mar. 3, 2006 (JP) ............................ 2006-057657

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2006.01) |

(52) U.S. Cl. .......................... 194/216; 194/217; 453/1; 453/2; 453/16; 453/58; 453/61; 221/196; 221/263; 700/236; 700/242; 700/244; 700/231

(58) Field of Classification Search ......... 194/215–217; 453/1, 2, 16, 17, 58–62; 221/6, 129, 131.132, 221/196, 263; 700/231, 232, 236, 237, 240–244
See application file for complete search history.

(56) References Cited

U.S. PATENT DOCUMENTS

2009/0017740 A1 * 1/2009 Oie et al. ...................... 453/58

FOREIGN PATENT DOCUMENTS

| | | |
|---|---|---|
| JP | 62-287390 | 12/1987 |
| JP | 5-303672 | 11/1993 |
| JP | 6-59958 | 8/1994 |
| JP | 2000-76517 | 3/2000 |
| JP | 2003-263682 | 9/2003 |

OTHER PUBLICATIONS

English translation of International Preliminary Report issued in PCT/JP2007/051803 dated Sep. 18, 2008.

* cited by examiner

*Primary Examiner*—Jeffrey A Shapiro
(74) *Attorney, Agent, or Firm*—Smith, Gambrell & Russell, LLP

(57) ABSTRACT

A change complement and control system according to the present invention comprises a coin-roll storage 1, a money handling machine 3 and a control unit 5. This system is adapted for calculating the number of coin rolls of each denomination newly stored in each coin-roll drawer 11, 12, 13, in a period of time after a first indication is sent and before a second indication is sent by an operator from user indication portions 50*a*, 50*b* of the control unit 5. An instruction portion 52 is adapted for providing an instruction, such that money equivalent to the newly stored coin rolls, among the money stored in a money storage portion (i.e., a coin storage portion 106 or banknote storage portion 206), is released from a money releasing portion (i.e., a coin disbursing slot 116 or banknote disbursing slot 216), when the second indication is sent.

6 Claims, 6 Drawing Sheets

CHANGE COMPLEMENT AND CONTROL SYSTEM

FIELD OF THE INVENTION

The present invention relates to a change complement and control system comprising a coin-roll (a roll of coins) storage adapted for storing therein coin rolls (or packages each prepared by collecting and wrapping a predetermined number of coins of the same denomination into a bar-like shape) of a plurality of denominations, and a money handling machine for handling money, such as coins, banknotes and the like. In particular, this invention relates to the change complement and control system for controlling a complement operation when loose coins are complemented, as changes, into a coin change machine, wherein the loose coins are obtained by unwrapping the package of each coin roll stored in the coin-roll storage.

BACKGROUND ART

As the change complement and control system described above, for example, those described in JP2003-263682A have been known. The system described in JP2003-263682A comprises a POS register including a coin change machine and a banknote change machine, and a packaged-coin handling machine communicatively connected with the POS register. In this system, the coin rolls (or packaged coins) are released, as needed, from the packaged-coin handling machine, and the loose coins obtained by unwrapping the package of each coin roll are then complemented, as the changes, into the coin change machine of the POS register.

SUMMARY OF THE INVENTION

In the conventional change complement and control system as disclosed in JP2003-263682A, when the coins of a particular denomination in the coin change machine is in a nearly empty condition (or condition in which almost no such coins are left in the machine), the coin rolls of the particular denomination should be taken out from the packaged-coin handling machine. Thereafter, the loose coins are prepared by unwrapping each of such coin rolls, and then the so-prepared loose coins are complemented into the coin change machine.

Thus, with repetition of such complement operations for the loose coins, the coin rolls of the particular denomination in the packaged-coin handling machine will be in turn in the nearly empty condition, and as such the complement of such coin rolls should be required for the packaged-coin handling machine. Generally, the coin rolls are controlled in a cash room of a store or the like. Therefore, the coin rolls will be provided to the packaged-coin handling machine from the cash room. In this case, for control of cash, the money equivalent (or of the same amount of money) to the coin rolls taken out from the cash room should be newly provided to the cash room.

Therefore, once the coin rolls are taken out from the cash room and complemented into the packaged-coin handling machine of the change complement and control system, the banknotes and/or coins equivalent to such complemented coin rolls should be taken out from the banknote change machine and/or coin change machine and then provided to the cash room. This work is a greater burden on a cashier or similar operator.

The present invention was made in light of such circumstances, and therefore it is an object of this invention to provide a change complement and control system, which can significantly mitigate the burden on the operator as well as can substantially reduce the time required for a series of work for complementing the coin rolls.

The change complement and control system according to the present invention comprises: a coin-roll storage adapted for storing therein coin rolls of a plurality of denominations, wherein the coin-roll storage includes a storage body, a coin-roll drawer, which is provided such that it can be drawn out relative to the storage body, and which has a plurality of coin-roll storage portions provided therein, each coin-roll storage portion being adapted for storing therein one coin roll of each particular denomination, and a coin-roll existence detection portion adapted for detecting presence or absence of the coin roll, for each coin-roll storage portion of the coin-roll drawer; a money handling machine provided in the vicinity of the coin-roll storage, wherein the money handling machine includes a money receiving portion adapted for receiving money from the exterior, a money storage portion adapted for storing therein the money received by the money receiving portion, for each denomination, and a money releasing portion adapted for releasing the money stored in the money storage portion to the exterior; a control unit adapted for controlling the money stored in the money storage portion of the money handling machine, such that the money can be automatically released from the money releasing portion, wherein the control unit includes a user indication portion, by which an operator can provide each indication, and an instruction portion adapted for providing the instruction to the money handling machine, and wherein the instruction portion provides the instruction, such that the number of the coin rolls of each denomination newly stored in the coin-roll drawer of the coin-roll storage is calculated, based on a detection result obtained from the coin-roll existence detection portion, in a period of time after a first indication is sent and before a second indication is sent by the operator from the user indication portion, and such that the money equivalent to the coin rolls newly stored in the coin-roll drawer, among the money stored in the money storage portion, is released from the money releasing portion when the second indication is sent.

According to this change complement and control system, upon complementing the coin rolls of particular denomination into the coin-roll storage, the money equivalent to the complemented coin rolls is released from the money handling machine, when only the first indication is provided by the operator and then the coin rolls are complemented into the coin-roll drawer and then the second indication is provided. Thus, the operator can eliminate the time and labor required for taking out, by hand, the money equivalent to the complemented coin rolls from the money handling machine, thereby mitigating the burden on the operator, as well as reducing the time required for a series of work for complementing the coin rolls. In addition, the control unit obtains information concerning the denomination and presence or absence of the coin rolls detected by the coin-roll existence detection portion of the coin-roll storage, so that the control unit directly provides the instruction to the money handling machine, based on such information. Accordingly, there is no need for installing an additional POS register or similar unit in the exterior, thereby providing a more compact entire system.

In the change complement and control system of this invention, it is preferred that the user indication portion of the control unit is provided in the money handling machine. In this manner, operability of the operator can be significantly enhanced.

In the change complement and control system of this invention, it is preferred that the control unit controls the coin-roll storage, such that the coin-roll drawer can be drawn out from the storage body, only in the period of time after the first indication is sent and before the second indication is sent by the operator from the user indication portion. In this way, drawing-out/pushing-in operations for the coin-roll drawer by the operator can be adequately controlled. This can securely prevent such an operational error that the operator inadvertently stores the coin rolls into the drawer before the first indication is sent.

In the change complement and control system of this invention, it is preferred that the money handling machine comprises a coin change machine adapted for disbursing and receiving coins among the money and a banknote change machine adapted for disbursing and receiving banknotes among the money.

In the change complement and control system of this invention, it is preferred that the instruction portion of the control unit is adapted for providing the instruction, such that the money equivalent to the coin rolls newly stored in the coin-roll drawer is released from the money releasing portion, by means of a combination of the denomination and quantity of the money that minimizes the numerical quantity of the money. In this way, the numerical quantity of such alternative money released from the money releasing portion can be minimized, thereby enhancing the operability of the operator.

In the change complement and control system of this invention, it is preferred that the instruction portion is adapted for providing the instruction to the money handling machine, such that the money handling machine does not release the money, when reduction of the total amount of money of the coin rolls stored in the coin-roll drawer of the coin-roll storage is calculated, in the period of time after the first indication is sent and before the second indication is sent by the operator from the user indication portion of the control unit.

DETAILED DESCRIPTION OF THE INVENTION

Hereinafter, one embodiment of the present invention will be described with reference to the drawings. FIGS. 1 to 8 are provided to respectively illustrate the embodiment of the change complement and control system according to the present invention.

Figure 1:
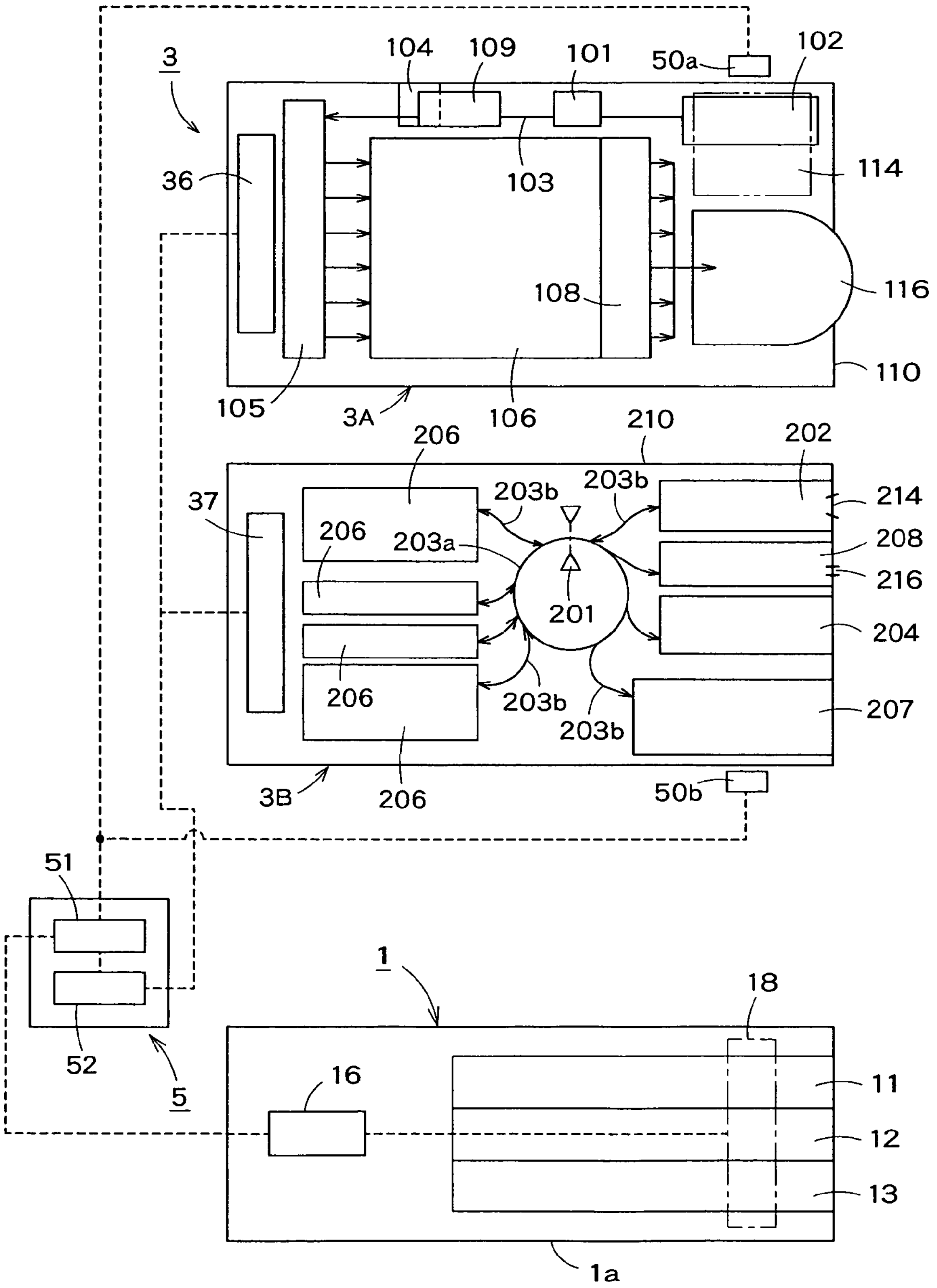
FIG. 1 is a block diagram showing one embodiment of the change complement and control system according to the present invention.
Figure 2:
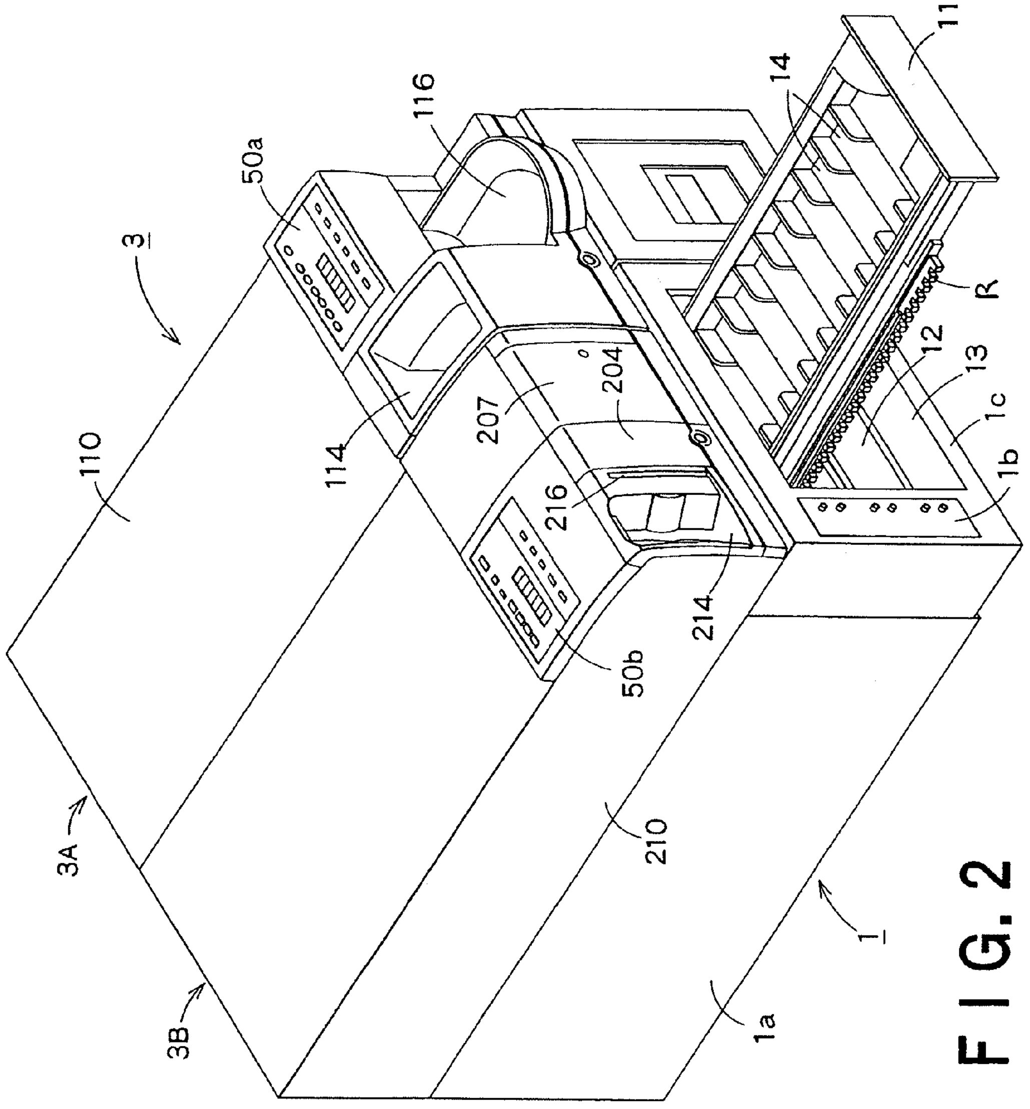
FIG. 2 is a perspective view showing the coin-roll storage and the money handling machine of the change complement and control system shown in FIG. 1.
Figure 3:
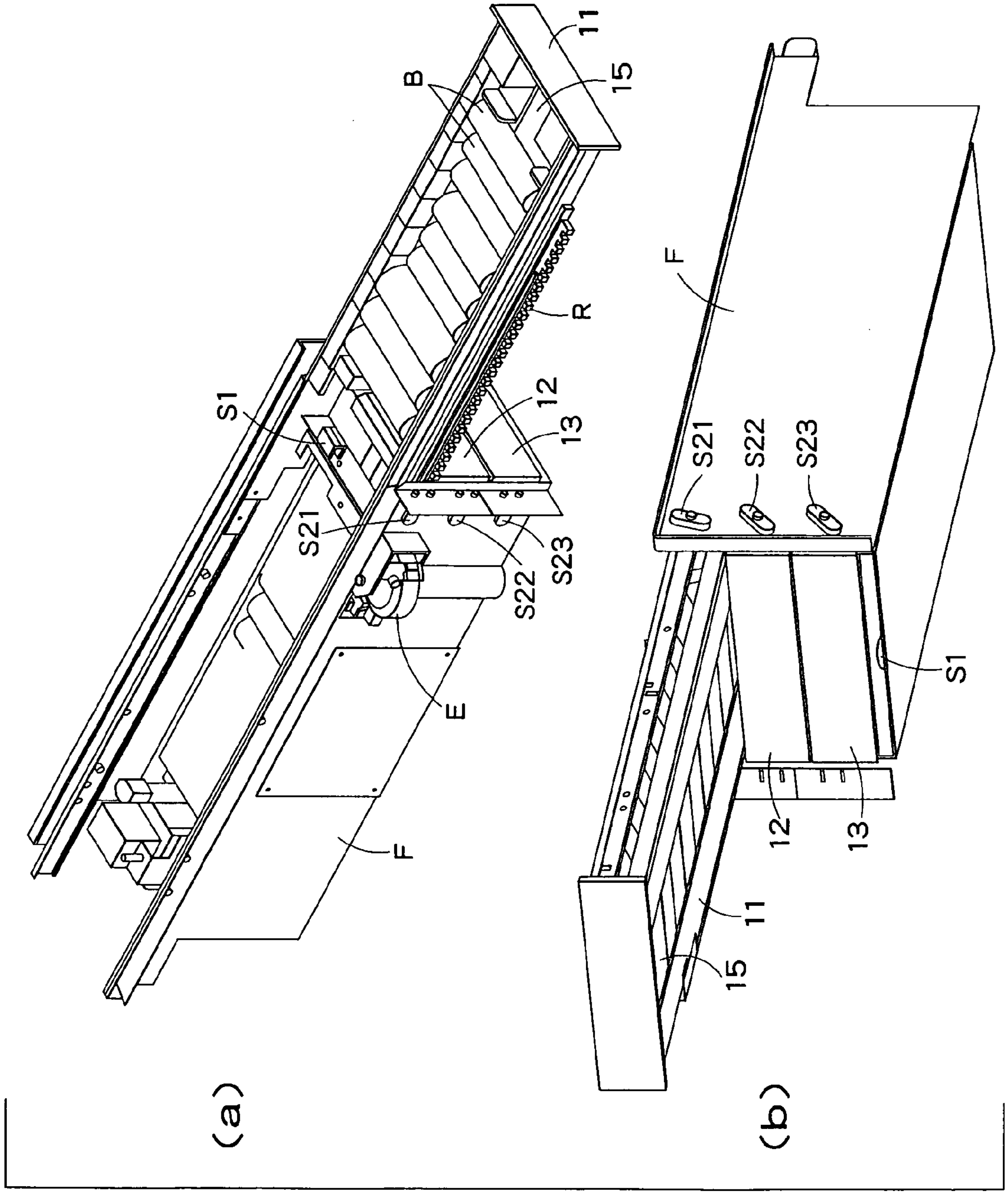
FIG. 3 shows an internal structure of the coin-roll storage shown in FIG. 2, wherein FIG. 3(*a*) is an upper perspective view and FIG. 3(*b*) is a lower perspective view.

Of these drawings, FIG. 1 is a block diagram showing one embodiment of the change complement and control system according to the present invention. FIG. 2 is a perspective view showing the coin-roll storage and the money handling machine of the change complement and control system shown in FIG. 1. FIG. 3 shows an internal structure of the coin-roll storage shown in FIG. 2, wherein FIG. 3(*a*) is an upper perspective view and FIG. 3(*b*) is a lower perspective view.

Figure 4:
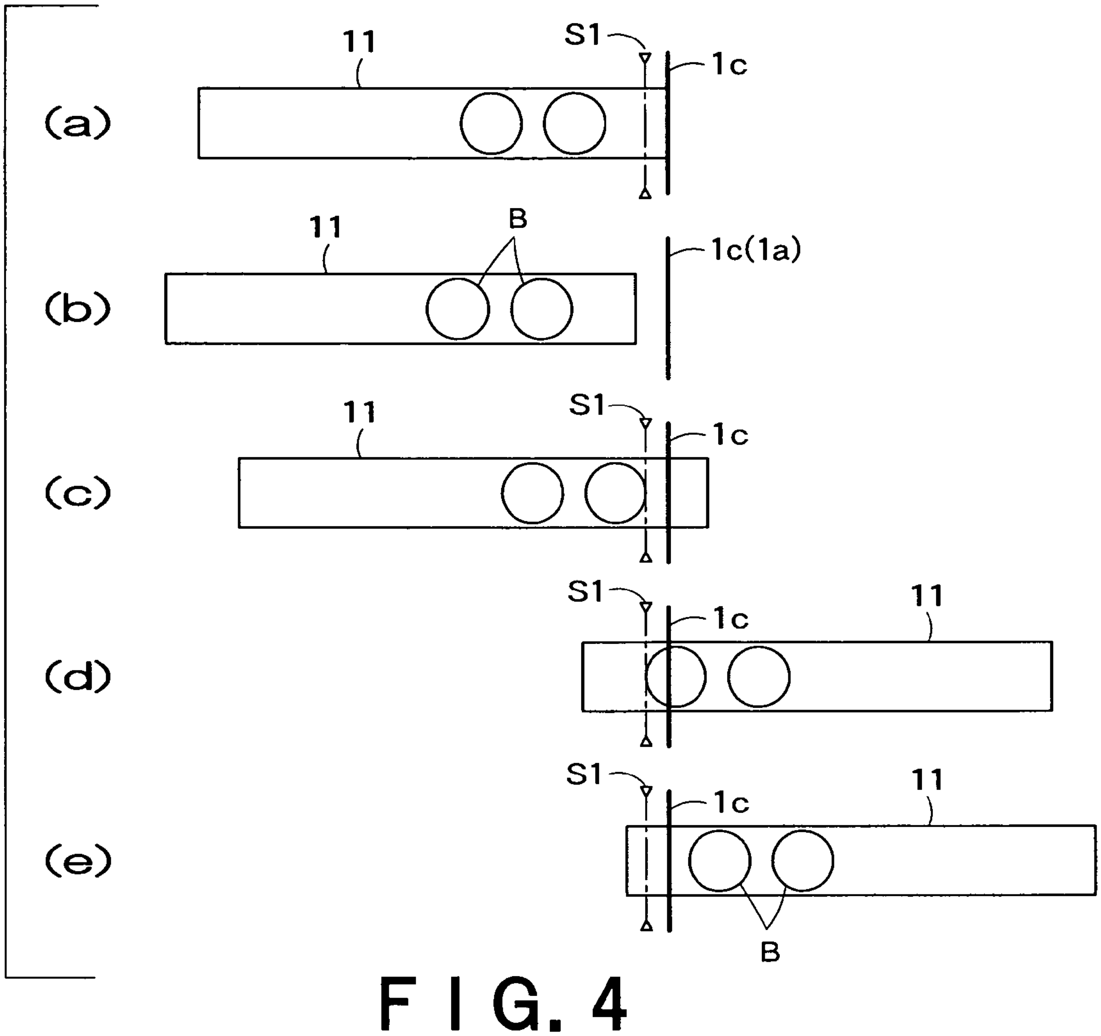
FIG. 4 is a schematic view of displacement of one coin-roll drawer in the coin-roll storage shown in FIG. 2, wherein the drawer is located in (*a*) a closing position, (*b*) a pushing-in position, (*c*) a detection start/end position, (*d*) a detection end/start position, and (e) a drawing-out position, respectively.
Figure 5:
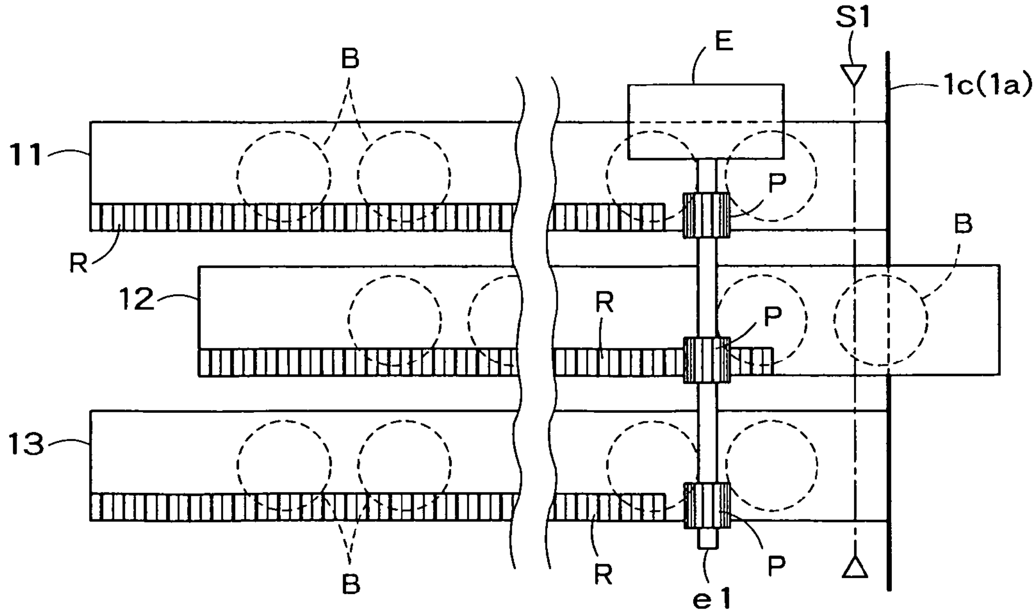
FIG. 5 is a side view schematically showing a relationship between each coin-roll drawer and a displacement detection unit in the coin-roll storage shown in FIG. 2.

FIG. 4 is a schematic view of displacement of one coin-roll drawer in the coin-roll storage shown in FIG. 2, wherein the drawer is depicted in (*a*) a closing position, (*b*) a pushing-in position, (*c*) a detection start/end position, (*d*) a detection end/start position, and (*e*) a drawing-out position, respectively. FIG. 5 is a side view schematically showing a relationship between each coin-roll drawer and a displacement detection unit in the coin-roll storage shown in FIG. 2.

Figure 6:
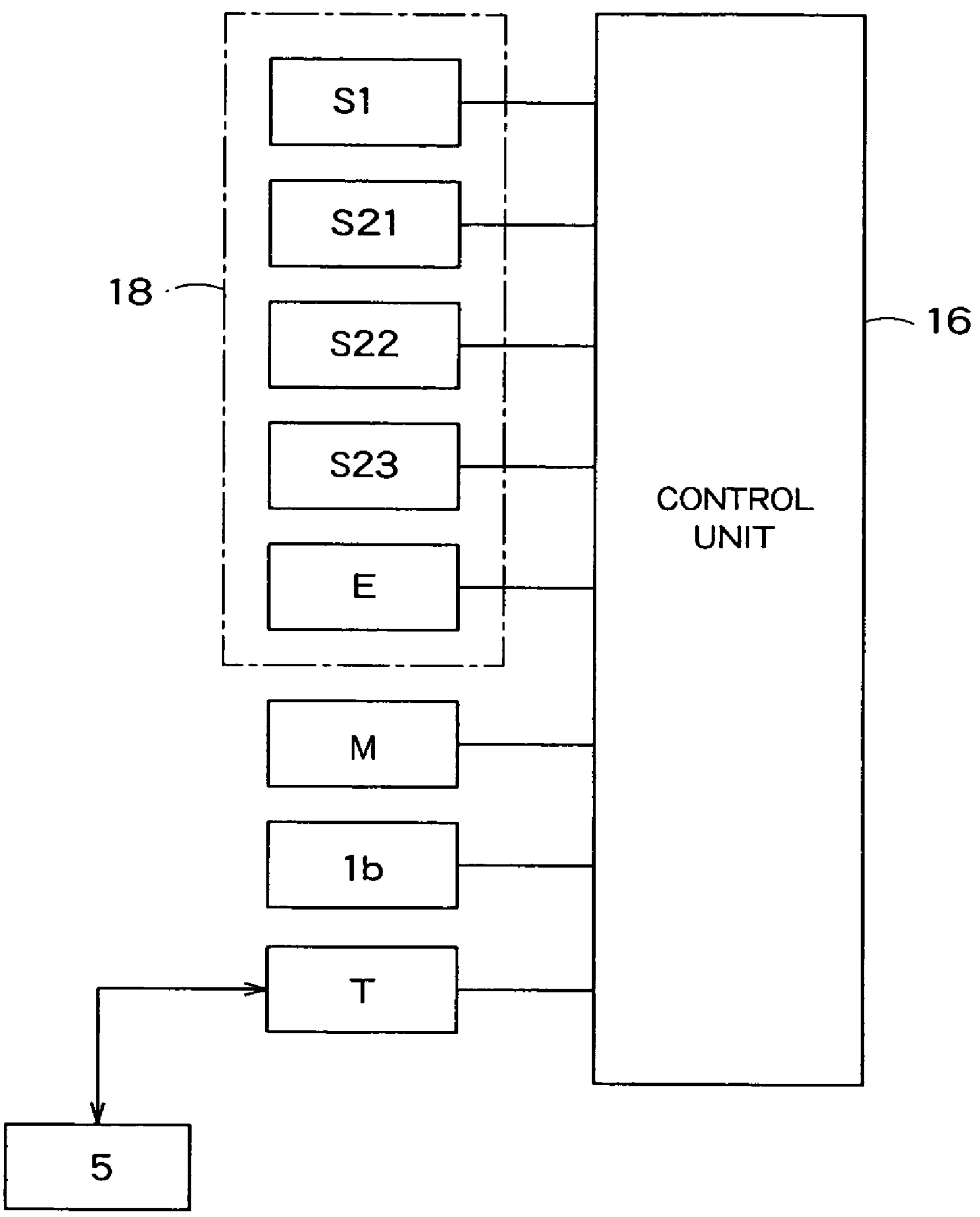
FIG. 6 is a block diagram showing a control system of the coin-roll storage shown in FIG. 2.
Figure 7:
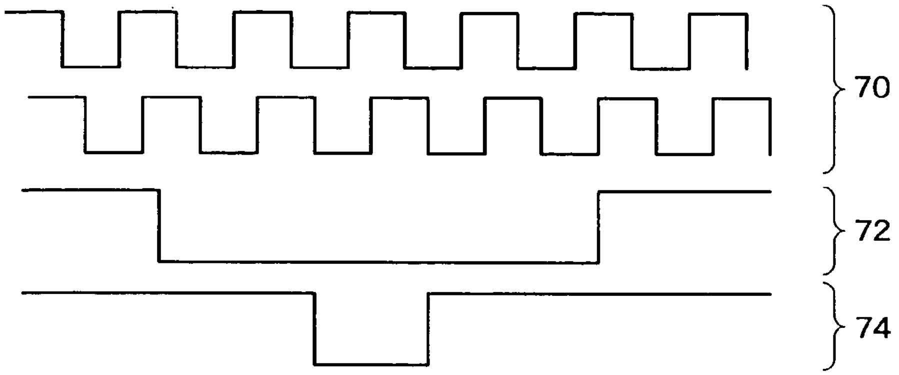
FIG. 7 is a diagram showing exemplary output signals of a rotary encoder and sensors shown in FIG. 3.
Figure 8:
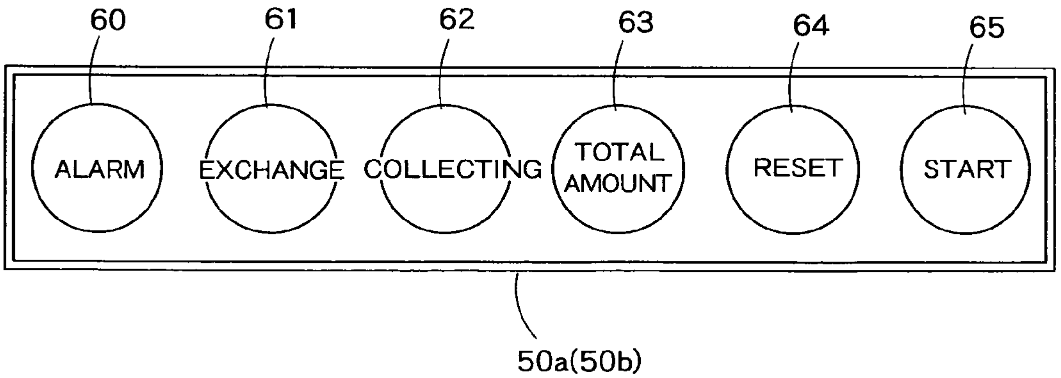
FIG. 8 is an illustration showing each construction of operation and display portions respectively provided to front surfaces of cases of the coin change machine and banknote change machine shown in FIG. 2.

FIG. 6 is a block diagram showing a control system of the coin-roll storage shown in FIG. 2, and FIG. 7 is a diagram showing exemplary output signals of a rotary encoder and sensors shown in FIG. 3. FIG. 8 is an illustration showing construction of operation and display portions respectively provided to front surfaces of cases of the coin change machine and banknote change machine shown in FIG. 2.

Hereinafter, construction of the change complement and control system of this embodiment, each specific construction of the coin-roll storage, coin handling machine and controller, and effects and modifications of this embodiment will be described, in succession, with reference to FIGS. 1 to 8.

[Construction of the Change Complement and Control System]

As shown in FIGS. 1 and 2, the change complement and control system of this embodiment includes, integrally, a money handling machine 3 adapted for handling money, such as coins and banknotes, a coin-roll storage 1 adapted for storing therein coin rolls of a plurality of denominations, and a controller (or control unit) 5 adapted for controlling the money handling machine 3 and coin-roll storage 1. This change complement and control system is configured to be operated by a cashier or similar operator. As shown in FIG. 2, in such a change complement and control system, the coin-roll storage 1 and money handling machine 3 are arranged to be adjacent relative to each other, one above the other.

The money handling machine 3 comprises a coin change machine 3A adapted for disbursing and receiving coins and a banknote change machine 3B adapted for disbursing and receiving banknotes. The coin change machine 3A and banknote change machine 3B include control units 36, 37, respectively. The control units 36, 37 are communicatively connected with the controller 5, respectively. The coin-roll storage 1 includes a control unit 16, and the control unit 16 is also communicatively connected with the controller 5.

[Construction of the Coin-Roll Storage]

As shown in FIGS. 2 and 3, the coin-roll storage 1 includes a storage body 1*a* and three coin-roll drawers 11, 12, 13 each configured to be pulled out forward (in a horizontal longitudinal direction), by hand, relative to the coin-roll storage 1*a*. Each coin-roll drawer 11, 12, 13 is provided with a plurality of coin-roll storage portions 14 (FIG. 2), such that each coin-roll storage portion 14 is adapted for storing therein one coin roll of each particular denomination. When stored in each coin-roll storage portion 14, the coin roll takes a horizontal attitude in which the axis of the coin roll is oriented in a lateral direction (or transverse direction) that is orthogonal to a drawing direction (or longitudinal direction) of each coin-roll drawer 11, 12, 13.

For instance, in the coin-roll drawer 11 provided on an upper stage, eight coin-roll storage portions 14 for one-yen coin rolls and two coin-roll storage portions 14 for five-yen coin rolls are provided. In the coin-roll drawer 12 provided on a middle stage, eight coin-roll storage portions 14 for ten-yen coin rolls and two coin-roll storage portions 14 for fifty-yen coin rolls are provided. In the coin-roll drawer 13 provided on a lower stage, eight coin-roll storage portions 14 for one-hundred-yen coin rolls and two coin-roll storage portions 14 for five-hundred-yen coin rolls are provided.

The coin-roll storage 1 includes a detection system (or coin-roll existence detection portion) 18 adapted for outputting a signal for determining the presence or absence and denomination of the coin roll, for each coin-roll storage portion 14 of the coin-roll drawers 11, 12, 13. The control system 18 is configured to determine the presence or absence and denomination of the coin roll, for each coin-roll storage portion 14, for example, when either one of the coin-roll drawers 11, 12, 13 is pushed into the storage body 1*a*. The control unit 16 of the coin-roll storage 1 serves as a determination unit having a function of determining the presence or absence and denomination of the coin roll stored in each coin-roll storage portion 14 of the particular coin-roll storage drawer 11, 12 or 13, based on the signal outputted from the detection system 18. To a front face of the storage body 1*a* of the coin-roll storage 1, a display panel 1*b* is provided. The display panel 1*b* is adapted for displaying a state or condition of FULL (completely filled), EMPTY (out of stock), etc., in regard to the coin rolls of each denomination, based on a determination result provided from the control unit 16 as the determination unit.

As used herein, each coin roll taken out (usually by a cashier or similar operator) from the respective coin-roll drawers 11, 12, 13 of the coin-roll storage 1 will be referred to as a "taken-out coin roll."

In FIG. 3, a frame F is shown as provided in the storage body 1*a* (FIG. 2) of the coin-roll storage 1. The frame F is configured to hold each coin-roll drawer 11, 12, 13, such that the drawer can slide in the longitudinal direction. A translucent portion (e.g., an opening or optically transparent portion) 15 is provided at a bottom portion of each coin-roll drawer 11, 12, 13. The translucent portion 15 extends over a region in which the plurality of coin-roll storage portions 14 (FIG. 2) of each coin-roll drawer 11, 12, 13 are arranged, as well as extends up to a position in the vicinity of a distal end of the coin-roll drawer across the forefront coin-roll storage portion 14. As is also shown in FIG. 5, a rack R extending in the longitudinal direction is provided on a left side of each coin-roll drawer 11, 12, 13.

In FIG. 4, one coin-roll drawer 11, as a representative of the three coin-roll drawers 11, 12, 13, is shown as located in various longitudinal positions, on the basis of a front panel 1*c* (see FIG. 2) of the storage body 1*a*.

In FIG. 4,

FIG. 4(*a*) designates a "closing position" in which a front face of the coin-roll drawer 11 is substantially flush with the front panel 1*c*;

FIG. 4(*b*) expresses a "pushing-in position" in which the coin-roll drawer 11 is further pushed inward from the closing position, and the front face of the coin-roll drawer 11 is positioned slightly inside from the front panel 1*c*;

FIG. 4(*c*) designates a "detection start/end position" in which detection by the detection system 18 (FIG. 1) is started when the coin-roll drawer 11 is drawn out, while the detection by the detection system 18 is ended when the coin-roll drawer 11 is pushed inward;

FIG. 4(*d*) expresses a "detection end/start position" in which the detection by the detection system 18 is ended when the coin-roll drawer 11 is drawn out, while the detection by the detection system 18 is started when the coin-roll drawer 11 is pushed inward; and FIG. 4(*e*) designates a "drawing-out position" in which the coin-roll drawer 11 is drawn out such that the coin rolls B can be stored and/or drawn out, for all of the coin-roll storage portions 14 (FIG. 2) of the coin-roll drawer 11.

As is also shown in FIG. 4, a coin-roll diameter sensor S1 that is a representative of the detection system 18 (FIG. 1) is provided.

As shown in FIG. 3, one coin-roll diameter sensor S1 and three coin-roll perforation sensors S21, S22, S23 are provided at a front portion of the frame F. The coin-roll diameter sensor S1 includes an emission unit and a light receiving unit respectively fixed to the frame F (or storage body 1*a*), in positions opposed relative to each other, across the translucent portions 15 of the three coin-roll drawers 11, 12, 13, from above and below. The coin-roll diameter sensor S1 is located in such a position that an optical axis of the sensor S1 can pass through a part of the translucent portion 15 in front of the forefront coin-roll storage portion 14 of each coin-roll drawer 11, 12, 13 located in the closing position (FIG. 4(*a*)).

The coin-roll perforation sensors S21, S22, S23 are provided, respectively corresponding to the coin-roll drawers 11, 12, 13. More specifically, each coin-roll perforation sensor S21, S22, S23 has an emission unit and a light receiving unit respectively fixed to the frame F (or storage body 1*a*), in positions opposed relative to each other, across each corresponding coin-roll drawer 11, 12, 13, from both sides. Each coin-roll perforation sensor S21, S22, S23 is located in such a position that an optical axis of the sensor can pass through a level corresponding to a center of each coin roll B stored in each corresponding coin-roll drawer 11, 12, 13.

Additionally, a single two-phase rotary encoder E is provided, on a front left side of the frame F, at a level substantially corresponding to the coin-roll drawer 11 on the upper stage. As shown in FIG. 5, the rotary encoder E has an input axis e1 extending downward. To the input axis e1, three pinions P are fixed, corresponding to the three racks R of the respective coin-roll drawers 11, 12, 13. The rack R of each coin-roll drawer 11, 12, 13 and each corresponding pinion P are positioned, respectively, such that they are meshed with each other at least when the coin-roll drawer 11, 12, 13 is located between the detection start/end position (FIG. 4(*c*)) and the detection end/start position (FIG. 4(*d*)) (or located in a position, within a range necessary for the determination by the determination unit, between the closing position (FIG. 4(*a*)) and the drawing-out position (FIG. 4(*e*)), while they are not meshed with each other at least when the coin-roll drawer 11, 12, 13 is located in the closing position.

In this case, the rotary encoder E is configured to output pulse signals in numbers proportional to each longitudinal displacement of the respective coin-roll drawers 11, 12, 13. Namely, the rotary encoder E, racks R and pinions P as described above constitute together the displacement detection unit adapted for detecting the longitudinal displacement of each coin-roll drawer 11, 12, 13 relative to the storage body 1*a*.

As shown in FIG. 6, the coin-roll diameter sensor S1, coin-roll perforation sensors S21, S22, S23 and rotary encoder E, constituting together the aforementioned detection unit 18, are connected with the control unit 16, respectively. In addition, the display panel 1*b* (see FIG. 2), a memory M and a communication interface T are also connected with the control unit 16, respectively. In the memory M, correspondence relationships, between each position of the coin-roll storage portions 14 in the respective coin-roll drawers 11, 12, 13 and each denomination of the coin rolls to be respectively stored in the coin-roll storage portions 14, are stored in advance. The communication interface T is provided for communicatively connecting the controller 5 with the control unit 16.

The control unit 16 serves as a determination unit having a function of determining the presence or absence and denomination of the coin roll stored in each coin-roll storage portion 14 of either one of the coin-roll storage drawers 11, 12, 13, based on the longitudinal displacement of the coin-roll storage drawer 11, 12 or 13 specified by an output of the rotary encoder E as well as on each output of the coin-roll diameter sensor S1 and the coin-roll perforation sensors S21, S22, S23.

Specifically, when a particular coin-roll drawer is drawn out/pushed inward, by hand, relative to the storage body 1*a*, the rotary encoder E, coin-roll diameter sensor S1 and coin-roll perforation sensors S21, S22, S23 each correspond to the particular coin-roll drawer output signals 70, 72, 74 as partly shown in FIG. 7, respectively. Of these signals, the longitudinal displacement of each coin-roll drawer 11, 12, 13 relative to the storage body 1*a* is specified by the pulse signal 70 outputted from the rotary encoder E. As such, the longitudinal displacement of each coin-roll storage portion 14 relative to each coin-roll perforation sensor S1; S21, S22, S23 can also be specified, based on the so-specified longitudinal displacement of each coin-roll drawer 11, 12, 13. Furthermore, a transition between transmitted light/blocked light (or presence or absence of the blocked light) caused by a radial outer periphery and inner periphery (or otherwise only by the outer periphery in the case other than five-yen and fifty-yen perforated coins) of each coin roll can be specified by the signals 72, 74 outputted from the respectively corresponding coin-roll sensors S1; S21, S22, S23.

In this way, not only the presence or absence of each coin roll B but also the diameter and/or presence or absence of a central perforation of the stored coin roll B can be specified, for each coin-roll storage portion 14 of the particular coin-roll drawer 11, 12 or 13. Based on such specified results, the control unit 16 can determine whether or not the coin roll B currently stored in each coin-roll storage portion 14 is one of the denomination to be correctly stored therein.

[Construction of the Money Handling Machine]

As described above, the money handling machine 3 is composed of the coin change machine 3A adapted for disbursing and receiving coins and the banknote change machine 3B adapted for disbursing and receiving banknotes.

The coin change machine 3A and banknote change machine 3B include, respectively:

money receiving portions (i.e., a coin receiving slot 114 and a banknote receiving slot 214) each adapted for receiving money (i.e., coins or banknotes) from the exterior;

money discrimination portions (i.e., a coin discrimination sensor 101 and a banknote discrimination sensor 201) each adapted for discriminating the denomination of the money received by the money receiving portions;

money storage portions (i.e., a coin storage portion 106 and a banknote storage portion 206) each adapted for storing therein the received money, for each denomination, corresponding to a discrimination result obtained from each money discrimination portion; and releasing portions (i.e., a coin disbursing slot 116 and a banknote disbursing slot 216) each adapted for releasing the money stored in each money storage portion.

Hereinafter, the construction of the coin-roll change machine 3A and banknote change machine 3B will be described more specifically.

As shown in FIGS. 1 and 2, the coin change machine 3A includes a case 110 having the coin receiving slot 114 and coin disbursing slot 116 provided in a front face thereof.

Additionally, as shown in FIG. 1, the coin change machine 3A includes a coin feed-in mechanism 102 adapted for feeding the coins received from the coin receiving slot 114 into the coin change machine 3A, with the coins arranged in a line without being stacked one on another. A coin transport path 103, which is adapted for transporting the coins fed in by the coin feed-in mechanism 102 extends, behind the coin feed-in mechanism 102. In the middle of the coin transport path 103, the coin discrimination sensor 101 adapted for discriminating the denomination or the like of the coins and a coin ejecting part 109 adapted for ejecting the coins to be ejected (i.e., reject coins) are provided, respectively. Below the coin ejecting part 109, an internal storage box 104 adapted for storing the reject coins or the like therein is detachably attached to the case 110.

On a downstream side of the coin transport path 103, a denomination sorting unit 105 is provided for sorting the coins based on each denomination. In addition, the coin storage portion 106 adapted for storing therein the coins sorted by the denomination sorting unit 105 and a coin feed-out mechanism 108 adapted for selectively feeding out the coins stored in the coin storage portion 106 are provided in the coin change machine 3A. As a result, the coins fed out by the coin feed-out mechanism 108 will be released into the coin disbursing slot 116.

The banknote change machine 3B shown in FIG. 1 includes a case 210, and a circular transport path 203*a* provided at a substantially central portion of the case 210. Additionally, in the case 210, a banknote feed-in unit 202, the banknote storage portions 206, a banknote releasing unit 208, a reject-upon-disbursement portion 204, and a banknote collecting cassette 207 are provided to surround together the outer periphery of the circular transport path 203*a*.

Furthermore, connection transport paths 203*b* are provided to connect the circular transport path 203*a* with the banknote feed-in unit 202, each banknote storage portion 206, banknote releasing unit 208, reject-upon-disbursement portion 204 and banknote collecting cassette 207, respectively. To a right side portion of the circular transport path 203*a*, the banknote discrimination sensor 201 is provided such that it can discriminate the denomination of each banknote or the like passing through the banknote discrimination sensor 201. It is noted that path diverting units (not shown) each adapted for diverting a transport path for each banknote between the circular transport path 203*a* and each connection transport path 203*b* are provided along the circular transport path 203*a*.

As shown in FIGS. 1 and 2, in a front face of the case 210, the banknote receiving slot 214 corresponding to the banknote feed-in unit 202 and the banknote disbursing slot 216 corresponding to the banknote releasing unit 208 are provided, respectively. The banknote collecting cassette 207 is detachably attached to the case 210.

In FIG. 1, the banknote feed-in unit 202 is adapted for first feeding in the banknotes inserted through the banknote receiving slot 214 and then feeding out such banknotes toward the circular transport path 203*a*. Each banknote storage portion 206 is adapted for storing therein the banknotes in response to each discrimination result obtained from the banknote discrimination sensor 201. Usually, the banknote storage portions 206 are used in four separated banknote storage sections respectively provided for one-thousand-yen banknotes, two-thousand-yen banknotes, five-thousand-yen banknotes and ten-thousand-yen banknotes. The banknote releasing unit 208 allows the banknotes taken out from each banknote storage portion 206 to be released from the banknote disbursing slot 216, so that such released banknotes can be pulled out from the slot 216. The reject-upon-disbursement portion 204 is provided to store therein the banknotes to be rejected upon disbursement. The banknote collecting cassette 207 is adapted for temporarily store therein the banknotes recovered from each banknote storage portion 206.

[Construction of the Controller]

Next, the construction of the controller 5 will be detailed with reference to FIGS. 1 and 2. The controller 5 includes operation and display portions (or user indication portions) 50*a*, 50*b*, a computation portion 51 and an instruction portion 52.

The operation and display portion 50*a* is provided in a front upper face of the case 110 of the coin change machine 3A, and the operation and display portion 50*b* is provided in a front upper face of the case 210 of the banknote change machine 3B. As shown in FIG. 8, each operation and display portion 50*a*, 50*b* includes an alarm button 60, an exchange button 61, a collection button 62, a total-amount button 63, a reset button 64 and a start button 65.

When a cashier or similar operator pushes the exchange button 61, an indication for starting complement of the coin rolls (or first indication) is provided from the operation and display portions 50*a*, 50*b*, respectively. Alternatively, when the cashier pushes the start button 65 after pushing the exchange button 61, an indication for ending the complement of the coin rolls (or second indication) is sent from the operation and display portions 50*a*, 50*b*, respectively.

As shown in FIG. 1, the computation portion 51 is communicatively connected with the operation and display portions 50*a*, 50*b*, respectively, and is also communicatively connected with the control unit 16 of the coin-roll storage 1 via the interface T. The computation portion 51 is adapted for calculating the number of the coin rolls of each denomination newly stored in each coin-roll drawer 11, 12, 13 of the coin-roll storage 1, in a period of time after the indication for starting the complement of the coin rolls is sent and before the indication for ending the complement of the coin rolls is sent by the operator from the operation and display portions 50*a*, 50*b*. Specifically, the number of the coin rolls of each denomination in each particular coin-roll drawer 11, 12, 13 detected by the detection system 18 before the first indication is sent, are stored in advance in the computation portion 51. Then, the particular coin-roll drawer 11, 12 or 13 is drawn out from the storage body 1*a* and the coin rolls are complemented into the coin-roll drawer, in the period of time after the indication for starting the complement of the coin rolls is sent and before the indication for ending the complement of the coin rolls is sent. Thereafter, when the coin-roll drawer is pushed into the storage body 1*a*, the number of the coin rolls of each denomination in the coin-roll drawer is detected again by the detection system 18. In this manner, the number of the coin rolls of each denomination newly stored in the coin-roll storage can be determined, by comparing such newly detected the number of the coin rolls of each denomination with the number of the coin rolls of each denomination stored in advance.

It is noted that the drawing-out/pushing-in operations of each coin-roll drawer 11, 12, 13 can be controlled by the controller 5, such that the coin-roll drawer 11, 12, 13 can be drawn out from the storage body 1*a*, only in the period of time after the indication for starting the complement of the coin rolls is sent and before the indication for ending the complement of the coin rolls is sent by the cashier or similar operator.

The instruction portion 52 is configured to receive information that is sent from the computation portion 51 and concerning the number of the coin rolls of each denomination newly stored in each coin roll drawer 11, 12, 13. Further, the instruction portion 52 is adapted for providing an instruction to each control unit 36, 37 of the money handling machine 3. More specifically, when the indication for ending the complement of the coin rolls is sent to the instruction portion 52 from the operation and display portions 50*a*, 50*b*, the instruction portion 52 will provide the instruction to each control unit 36, 37, such that the money equivalent (or of the same amount of money) to the coin rolls newly stored in each coin-roll drawer 11, 12, 13 can be released from the coin disbursing slot 116 of the coin change machine 3A or from the banknote disbursing slot 216 of the banknote change machine 3B.

In this case, the instruction portion 52 is adapted for providing the instruction, such that the money equivalent to the coin rolls newly stored in each coin-roll drawer 11, 12, 13 can be released from the coin disbursing slot 116 of the coin change machine 3A or from the banknote disbursing slot 216 of the banknote change machine 3B, by means of a combination of the denomination and quantity of the money that can minimize the numerical quantity of the money. Specifically, in the case in which one coin roll consisting of fifty one-hundred-yen coins packaged therein is newly stored in either one of the coin-roll drawers 11, 12, 13, the amount of money of the coin roll newly stored in the coin-roll storage 1 is five thousand yen (5,000 yen). Therefore, one five-thousand-yen banknote is released from the banknote disbursing slot 216 of the banknote change machine 3B so as to minimize the numerical quantity of the money released from the money handling machine 3. Alternatively, in the case in which one fifty-yen coin roll consisting of fifty fifty-yen coins packaged therein is newly stored in either one of the coin-roll drawers 11, 12, 13, the amount of money of the coin roll newly stored in the coin-roll storage 1 is 2,500 yen. Thus, one two-thousand-yen banknote (or two one-thousand-yen banknotes if the two-thousand-yen banknote is set as unusable) is released from the banknote disbursing slot 216 of the banknote change machine 3B, while one five-hundred-yen coin is released from the coin disbursing slot 116 of the coin change machine 3A. Otherwise, in the case in which one ten-yen coin roll consisting of fifty ten-yen coins packaged therein is newly stored in either one of the coin-roll drawers 11, 12, 13, the amount of money of the coin roll newly stored in the coin-roll storage 1 is 500 yen. As such, one five-hundred yen coin is released from the coin disbursing slot 116 of the coin change machine 3A.

It is noted that the coin rolls of one denomination can be complemented into either one of the coin-roll drawer 11, 12, 13 while taking out the coin rolls of another denomination from the same or another coin-roll drawer 11, 12, 13, in the period of time after the indication for starting the complement of the coin rolls is sent and before the indication for ending the complement of the coin rolls is sent by the operator from the operation and display portions 50*a*, 50*b*. In such a case, there is a possibility that the total amount of the coin rolls finally stored in the respective coin-roll drawers 11, 12, 13 of the coin-roll storage 1 is reduced. Once the computation portion 51 determines that the total amount of the coin rolls stored in the coin-roll storage 1 is reduced, the instruction portion 52 provides an instruction to the money handling machine 3 so as to bring it into a "waiting mode." In addition, the instruction portion 52 provides another instruction to each money releasing portion (i.e., the coin disbursing slot 116 or banknote disbursing slot 216), such that it will not release the money any more. When the money handling machine 3 is brought into the waiting mode, the cashier or similar operator will push the reset button 64, once for a relatively long time, and then push the reset button 64 again. As a result, the waiting mode is released, and the money handling machine 3 is then brought into a complement-end state for the coin rolls.

[Effects]

Next, the effects of the change complement and control system of the embodiment constructed as described above will be discussed.

According to the change complement and control system of this embodiment, the number of the coin rolls of each denomination newly stored in the coin-roll drawers 11, 12, 13 is calculated, in the period of time after the first indication is sent and before the second indication is sent by the operator, such as the cashier or the like, from the operation and display portions (or user indication portions) 50*a*, 50*b* of the controller 5. Thereafter, when the second indication is sent, the instruction portion 52 will provide the instruction to the money releasing portion (i.e., the coin disbursing slot 116 or banknote disbursing unit 216) such that it will release the money equivalent to the coin rolls newly stored, among the money stored in the money storage portion (i.e., the coin storage portion 106 or banknote storage portion 206). Therefore, upon complementing the coin rolls of each particular denomination into the coin-roll storage 1, the money equivalent to the complemented coin rolls is released from the money handling machine 3, when only the first indication is provided to the operation and display portions 50*a*, 50*b* by the operator and then the coin rolls are complemented into the coin-roll drawer and then the second indication is provided. This can eliminate the time and labor required for the operator to take out, by hand, the money equivalent to the complemented coin rolls from the money handling machine, as such mitigating the burden on the operator, as well as reducing the time required for a series of work for complementing the coin rolls.

Furthermore, the information concerning the denomination and presence or absence of the coin rolls detected by the detection system 18 of the coin-roll storage 1 is sent to the controller 5, and the controller 5 provides the instruction directly to the money handling machine 3 based on the information. Thus, there is no need for installing an additional POS register or similar unit in the exterior, thereby providing a more compact entire system.

Because the operation and display portions (or user indication portions) 50*a*, 50*b* of the controller 5 are respectively provided to the coin change machine 3A and banknote change machine 3B, operability of the operator, such as the cashier or the like, can be significantly enhanced.

In addition, the controller 5 can control the coin-roll storage 1 such that each coin-roll drawer 11, 12, 13 can be drawn out from the storage body 1*a* only in the period of time after the first indication is sent and before the second indication is sent by the operator from the operation and display portions 50*a*, 50*b*. Accordingly, the drawing-out/pushing-in operations of each coin-roll drawer 11, 12, 13 by the operator are controlled. Thus, such an operational error that the operator inadvertently stores the coin rolls into the drawers before the first indication is sent can be prevented.

Moreover, the instruction portion 52 of the controller 5 is adapted for providing an instruction to the money releasing portion (i.e., the coin disbursing slot 116 or banknote disbursing unit 216) so as to allow the money releasing portion to release the money equivalent to the coin rolls newly stored in each coin-roll drawer 11, 12, 13, by means of a combination of the denomination and quantity of the money that can minimize the numerical quantity of the money. Therefore, the numerical quantity of such alternative money released from the money releasing portion can be minimized, thereby enhancing the operability of the operator, such as the cashier or the like.

[Modifications]

The change complement and control system according to this embodiment is not limited to the aspect as described above, but may include various modifications without departing from the scope of this invention.

For instance, the money handling machine 3 is not limited to one composed of both of the coin change machine 3A and the banknote change machine 3B, but may be composed of, for example, only the coin change machine 3A.

In addition, the control unit for controlling each money releasing portion such that it can automatically release the money stored in each money storage portion of the money handling machine 3 is not limited to the controller 5 described above. For instance, either one or combination of the control units 16, 36, 37 may also be used for performing the control as described above. Furthermore, each user indication portion may be provided to the coin-roll storage 1, rather than provided to the money handling machine 3.

The invention claimed is:

1. A change complement and control system, comprising:

a coin-roll storage adapted for storing therein coin rolls of a plurality of denominations, wherein the coin-roll storage includes a storage body, a coin-roll drawer, which is provided such that it can be drawn out relative to the storage body, and which has a plurality of coin-roll storage portions provided therein, each coin-roll storage portion being adapted for storing therein one coin roll of each particular denomination, and a coin-roll existence detection portion adapted for detecting presence or absence of the coin roll, for each coin-roll storage portion of the coin-roll drawer;

a money handling machine provided in the vicinity of the coin-roll storage, wherein the money handling machine includes a money receiving portion adapted for receiving money from the exterior, a money storage portion adapted for storing therein the money received by the money receiving portion, for each denomination, and a money releasing portion adapted for releasing the money stored in the money storage portion to the exterior;

a control unit adapted for controlling the money stored in the money storage portion of the money handling machine, such that the money can be automatically released from the money releasing portion, wherein the control unit includes a user indication portion, by which an operator can provide each indication, and an instruction portion adapted for providing the instruction to the money handling machine, and wherein the instruction portion provides the instruction, such that the number of the coin rolls of each denomination newly stored in the coin-roll drawer of the coin-roll storage is calculated, based on a detection result obtained from the coin-roll existence detection portion, in a period of time after a first indication is sent and before a second indication is sent by the operator from the user indication portion, and such that the money equivalent to the coin rolls newly stored in the coin-roll drawer, among the money stored in the money storage portion, is released from the money releasing portion when the second indication is sent.

2. The change complement and control system according to claim 1, wherein the user indication portion of the control unit is provided in the money handling machine.

3. The change complement and control system according to claim 1, wherein the control unit controls the coin-roll storage, such that the coin-roll drawer can be drawn out from the storage body, only in the period of time after the first indication is sent and before the second indication is sent by the operator from the user indication portion.

4. The change complement and control system according to claim 1, wherein the money handling machine comprises a coin change machine adapted for disbursing and receiving coins among the money and a banknote change machine adapted for disbursing and receiving banknotes among the money.

5. The change complement and control system according to claim 1, wherein the instruction portion of the control unit is adapted for providing the instruction, such that the money equivalent to the coin rolls newly stored in the coin-roll drawer is released from the money releasing portion, by means of a combination of the denomination and quantity of the money that minimizes the numerical quantity of the money.

6. The change complement and control system according to claim 1, wherein the instruction portion is adapted for providing the instruction to the money handling machine, such that the money handling machine does not release the money, when reduction of the total amount of money of the coin rolls stored in the coin-roll drawer of the coin-roll storage is calculated, in the period of time after the first indication is sent and before the second indication is sent by the operator from the user indication portion of the control unit.

* * * * *